United States Patent [11] 3,600,595

[72] Inventor Kei Yasunobu
 11-22-304 5-Chome Roppongi, Minato-Ku,
 Tokyo, Japan
[21] Appl. No. 52,929
[22] Filed July 7, 1970
[45] Patented Aug. 17, 1971
[32] Priority Aug. 7, 1969
[33] Japan
[31] 44/62048

[54] METHOD AND ARRANGEMENT FOR INTERCONNECTING HYDROELECTRIC PUMPING-UP POWER SYSTEM
2 Claims, 2 Drawing Figs.

[52] U.S. Cl. ..................................................... 290/52
[51] Int. Cl. ..................................................... F15b 1/06
[50] Field of Search .......................................... 290/1, 4,
 43, 52, 54

[56] References Cited
UNITED STATES PATENTS
1,494,008  5/1924  Nagler ........................... 290/52 X
2,962,599  11/1960 Pirkey ........................... 290/4

Primary Examiner—Oris L. Rader
Assistant Examiner—W. E. Duncanson, Jr.
Attorney—Waters, Roditi, Schwartz & Nissen ABSTRACT: Interconnection of a plurality of hydroelectric pumping-up power systems is achieved by providing two groups of pumping-up hydroelectric power plants on respective sides of a mountain and by accommodatively transferring water thus pumped up between water reservoirs provided at the highest levels on respective sides of the mountain through a corresponding number of water tunnels or the like, and the water thus transferred can be utilized for various purposes in addition to hydroelectric power generation.

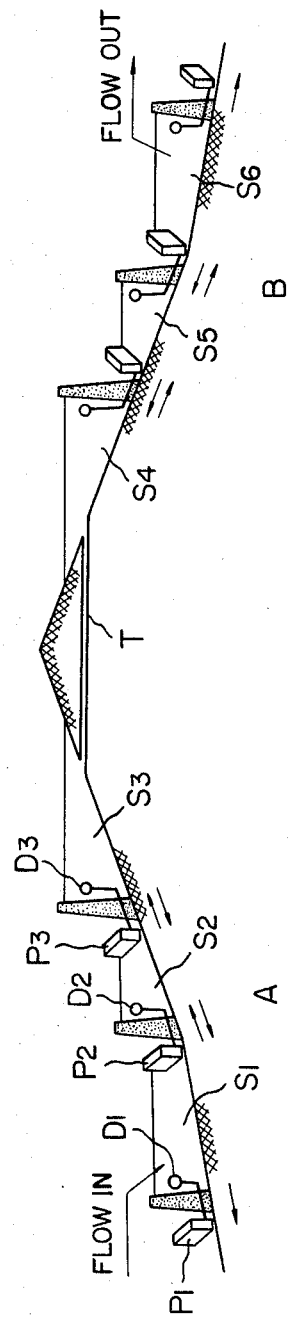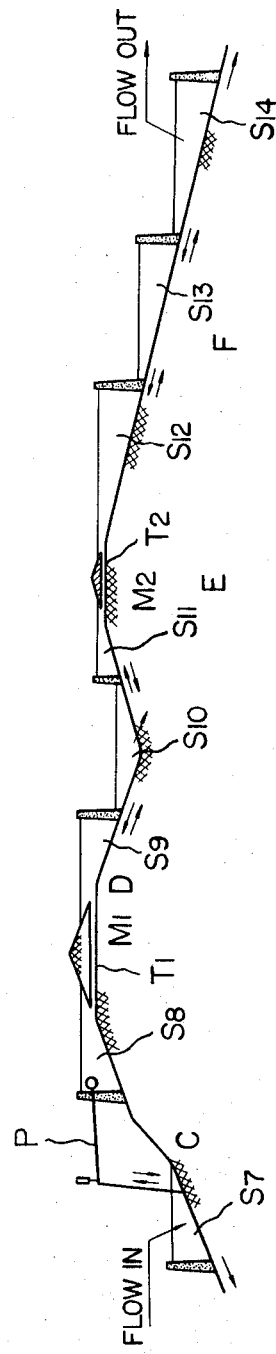

METHOD AND ARRANGEMENT FOR INTERCONNECTING HYDROELECTRIC PUMPING-UP POWER SYSTEM

BACKGROUND OF THE INVENTION

This invention relates generally to a method and an arrangement for interconnecting different pumping-up hydroelectric power system (known also as pumped-storage hydroelectric power stations), and more particularly to a type thereof wherein the interconnection of the hydroelectric power systems is achieved by accommodating water through a water tunnel or the like.

Heretofore, a plurality of pumping-up hydroelectric power systems have been interconnected through electric power transmission lines only, and none of the systems have yet been interconnected through a direct accommodation of water between the plurality of the power systems. That is, no transportation of water through a long distance as is usually required in the direct accommodation of water between different hydroelectric systems have been attempted successfully because of the requirement of a prohibitively high initial cost.

SUMMARY OF THE INVENTION

A principal object of this invention is to provide a novel interconnecting method and arrangement for interconnecting different hydroelectric power systems, wherein water is transported directly from one of the hydroelectric power system to the other with a minimum initial cost.

Another object of the invention is to provide a novel method and arrangement for interconnecting different pumping-up type hydroelectric power systems through a water tunnel or the like provided at a high level in a mountain.

Still another object of the invention is to provide a novel method and arrangement for interconnecting different pumping-up hydroelectric power systems, wherein the river water thus transported from one hydroelectric power system to the other may also be utilized for other purposes such as irrigation.

These and other objects of the present invention can be achieved by a novel method and arrangement for practicing the method for interconnecting a plurality of pumping-up hydroelectric power systems disposed on different sides of a mountain, wherein a series of pumping-up hydroelectric power plants are provided on respective sides of the mountain, and the water reservoirs provided for the pumping-up power plants at highest levels of the mountain are interconnected by a water tunnel or the like of a comparatively short length, whereby the river water belonging to a hydroelectric power system can be successively pumped up to the reservoir at a highest level and transferred through the water tunnel or the like to another water reservoir at a highest level on the other side of the mountain and belonging to another hydroelectric power system.

The nature, principle, and utility of the present invention will be more clearly understood from the following description with respect to preferred embodiments thereof when read in conjunction with the accompanying drawing.

BRIEF DESCRIPTION OF THE DRAWING

In the drawing:

FIG. 1 is a schematic view showing the basic principle of the interconnecting system according to the present invention; and FIG. 2 is a similar view showing a practical example of the interconnecting system constituting a typical embodiment of the invention.

DETAILED DESCRIPTION OF THE INVENTION

Referring to FIG. 1 sowing the basic principle of a method and arrangement for interconnecting a plurality of pumping-up hydroelectric power systems according to the present invention, there are indicated for the purpose of simplification two stages of hydroelectric power plants of pumping-up type provided on each of two sides A and B of a mountain. The individual pumping-up power plant follows the ordinary operational practice wherein the water in a lower level reservoir is pumped up during offpeak time such as night time or holidays to an upper level reservoir. The principal feature of the present invention is that the different hydroelectric power systems located on two respective sides of the mountain can be interconnected with each other through a minimum length of a tunnel or a water passage so that a required amount of water can be accommodatively transferred from one of the hydroelectric power systems to the other for the purpose of generating electric power or of irrigation.

More specifically, hydroelectric power plants P1, P2, and P3 and the associated water reservoirs or dams S1, S2, and S3 are provided on one side A of a mountain. Water intakes D1, D2, and D3 are provided in these water reservoirs and water taken from these water intakes D1, D2, and D3 is thereafter guided through water conduits or passages to the corresponding hydroelectric power plants P1, P2, and P3. Of these power plants, power plants P2 and P3 are provided with reversible turbines for pumping water up to the higher stage reservoirs S2 and S3.

On the other side B of the mountain, two-stage pumping-up hydroelectric power plants of similar arrangement as described above and having water reservoirs S4, S5, and S6 are provided. According to a characteristic feature of the present invention, the reservoirs S3 and S4 located at highest levels on the two sides of the mountain are connected together through a water passage of, for instance, a water tunnel T so that both of the water systems are thereby interconnected.

The operation of the arrangement shown in FIG. 1 will be described with respect to the case wherein the water is transferred from side A of the mountain to the side B thereof. It will be assumed that the hydroelectric power plants on side A of the mountain are supplying a comparatively lower peak load than that supplied by the power plants on side B of the mountain, and also that the water reservoir S1 at the lower level on side A has a sufficient water quantity. Then, a part of the water in the reservoir S1 can be pumped up sequentially to the reservoir S3 and transferred through the water tunnel T to the reservoir S4 on side B of the mountain. The water thus transferred to the reservoir S4 is then employed for generating electric power while it descends sequentially through the reservoirs S5 and S6 or for other purposes such as irrigating the nearby areas.

Of course, it is apparent that the above-described transfer of water through the water tunnel T will not occur when the peak load supported by the power plant group on side A of the mountain is very high and there is no excessive power capacity, in terms of water quantity, in this hydroelectric power plant group.

In FIG. 2, there is illustrated a typical example of the interconnection of a plurality of pumping-up hydroelectric power plant systems according to the present invention, wherein the above-described basic form of the invention is applied in a practical case. In this practical example, water reservoirs S7 and S8 are provided on one side C of a mountain M1 and water reservoirs S9 and S10 are provided on the other side D of the mountain M1. Likewise, water reservoirs S11 is provided on the E side of another mountain M2 which is located adjacent to the mountain M1, so that the water reservoir S11 is also located near and at a higher level than the water reservoir S10. On the other side F of the mountain M2, water reservoirs S12, S13, and S14 are provided.

Between the water reservoirs S8 and S9, there is provided a water tunnel T1 passing through the mountain M1, and between the water reservoirs S11 and S12, there is provided another water tunnel T2 passing through the mountain M2. Although omitted in the drawing for the purpose of simplification, hydroelectric power plants as shown in FIG. 1 are provided at the lower parts of all of the water reservoirs. Within these power plants, those for the water reservoirs S7, S10, and S14 are provided with unidirectional turbines, and the rest of the power plants are provided with reversible turbines.

It will be apparent that the embodiment of the invention shown in FIG. 2 may transfer an amount of water from side C of the mountain M1 to side F of the mountain M2, or vice versa.

Although the invention has been described with respect to preferred embodiments thereof, it will be apparent that various modifications and alterations may also be carried out therein by those skilled in the art. For instance, provisions may be made so that not only the water reservoirs at the lowest levels on both sides of these mountains but also water reservoirs located intermediately between these reservoirs at the lowest levels can also be employed for purposes other than hydroelectric power generation, such as irrigation or for city water supply. Otherwise, the number of stages of the pumping-up hydroelectric power plants may be selected suitably to adapt to the actual conditions of the mountains, and the water reservoirs shown in the drawing as being contiguous only for illustrative purposes may also be provided separately with an intervention of a suitable distance and connected by means of a pipe line. When expedient, a reservoir of a highest level is provided on only one side of a mountain, and the water in the reservoir may be guided through a water tunnel T directly into a lower level water reservoir on the other side of the mountain. When possible, the water tunnel T1 or T2 may also be replaced by a water channel or any other suitable form of water conducting means.

As is apparent from the above description, according to the present invention, a suitable number of pumping-up hydroelectric power plants are provided at a plurality of suitable positions along two river systems, and, by merely interconnecting the reservoirs at the highest levels on both sides of a mountain through a tunnel or the like, a required quantity of water can be transferred from one of the rivers of the other. Thus, the transfer of water between two or more water systems can be carried out without requiring tunnels of long lengths, and various advantageous features thereby resulting are obtained. For instance, the transfer of water may be utilized for industrial use, for city water resources, irrigation purposes, and for flood preventing purposes, while the water is simultaneously employed for the hydroelectric power generation.

I claim:

1. A method for interconnecting a plurality of pumping-up hydroelectric power systems disposed on respectively different sides of a mountain, comprising pumping-up water successively into water reservoirs of higher levels provided on the sides of the mountain during an offpeak time of a system, and accommodatively transferring water from one of the systems to the other through a water tunnel or the like provided between water reservoirs located at the highest levels of the mountain for the respective hydroelectric power systems.

2. An interconnecting system of a plurality of pumping-up hydroelectric power systems disposed on respectively different sides of a mountain, comprising groups of pumping-up hydroelectric power plants provided on the corresponding sides of a mountain and a tunnel or the like provided between the highest level water reservoirs belonging to respective hydroelectric power systems, whereby water can be accommodatively transferred from one of the hydroelectric power systems to another through said water tunnel or the like.